United States Patent [19]

Monaghan

[11] 4,367,011

[45] Jan. 4, 1983

[54] OPTICAL FIBER CONNECTOR AND MEANS AND METHOD FOR CENTERING OPTICAL FIBERS

[75] Inventor: Kevin J. Monaghan, Middlebury, Conn.

[73] Assignee: Bunker Ramo Corporation, Oak Brook, Ill.

[21] Appl. No.: 248,303

[22] Filed: Mar. 27, 1981

Related U.S. Application Data

[63] Continuation of Ser. No. 37,260, May 9, 1979, abandoned.

[51] Int. Cl.³ ............................................. G02B 7/26
[52] U.S. Cl. ............................. 350/96.20; 350/96.21
[58] Field of Search ............... 350/96.15, 96.17, 96.20, 350/96.21, 320; 250/227

[56] References Cited

U.S. PATENT DOCUMENTS

| | | |
|---|---|---|
| 3,517,981 | 6/1970 | Rueger et al. . |
| 3,846,010 | 11/1974 | Love et al. . |
| 3,861,781 | 1/1975 | Hasegawa et al. . |
| 3,885,859 | 5/1975 | Dalgleish . |
| 3,902,785 | 9/1975 | Mathews . |
| 3,910,678 | 10/1975 | McCartney et al. . |
| 3,914,015 | 10/1975 | McCartney . |
| 3,923,371 | 12/1975 | Dalgleish . |
| 3,936,143 | 2/1976 | Sato . |
| 3,941,485 | 3/1976 | Madden . |
| 3,954,338 | 5/1976 | Hennel et al. . |
| 3,958,114 | 5/1976 | Codrino . |
| 3,966,299 | 6/1976 | Osterfield . |
| 3,999,841 | 12/1976 | Dakss et al. . |
| 4,009,931 | 3/1977 | Malsby . |
| 4,023,886 | 5/1977 | Nakayama et al. . |
| 4,026,633 | 5/1977 | Crick . |
| 4,029,390 | 6/1977 | Chinnock et al. . |
| 4,030,809 | 6/1977 | Onishi et al. . |
| 4,033,668 | 7/1977 | Presby . |
| 4,046,453 | 9/1977 | Fiebelkohn et al. . |
| 4,047,796 | 9/1977 | Kao et al. . |
| 4,050,783 | 9/1977 | Tardy . |
| 4,056,305 | 11/1977 | McCartney et al. . |
| 4,061,416 | 12/1977 | Stewart . |
| 4,062,624 | 12/1977 | Hammer . |
| 4,074,415 | 2/1978 | Steiff . |
| 4,084,308 | 4/1978 | Runge . |
| 4,087,155 | 5/1978 | Deacon . |
| 4,090,778 | 5/1978 | Phillips . |
| 4,101,198 | 7/1978 | Heldt . |
| 4,113,346 | 9/1978 | Jackson et al. .................. 350/96.20 |
| 4,133,601 | 1/1979 | LeGuen et al. .................. 350/96.21 |
| 4,139,260 | 2/1979 | Bouygues et al. ............... 350/96.22 |
| 4,142,776 | 3/1979 | Cherin et al. ................... 350/96.21 |
| 4,158,477 | 6/1979 | Phillips et al. .................. 350/96.21 |

FOREIGN PATENT DOCUMENTS

| | | |
|---|---|---|
| 2522804 | 12/1976 | Fed. Rep. of Germany . |
| 2175547 | 10/1973 | France . |
| 2308115 | 12/1976 | France . |
| 1452474 | 10/1976 | United Kingdom . |
| 1479575 | 7/1977 | United Kingdom . |
| 1486681 | 9/1977 | United Kingdom . |
| 1499940 | 2/1978 | United Kingdom . |
| 1515497 | 6/1978 | United Kingdom . |
| 1544738 | 4/1979 | United Kingdom . |
| 2005434 | 4/1979 | United Kingdom . |
| 2007867 | 5/1979 | United Kingdom . |
| 2028534 | 3/1980 | United Kingdom . |

*Primary Examiner*—John D. Lee
*Assistant Examiner*—Frank Gonzalez

[57] ABSTRACT

A fiber optic connector is disclosed, along with a means and method of centering or properly positioning optical fibers with respect to the connectors, for optically coupling a pair of fiber optic cables or a single fiber optic cable and a light source or detector, wherein the cable includes an outer coating and an inner fiber core which may or may not be concentric with the outer coating. A terminal member is provided which includes a body having a through hole extending axially therethrough, the through hole having a first portion extending through a forward mating end of the terminal member and through a boss portion protruding outwardly from the body portion of the terminal member. The first portion is sized to snugly receive a length of the fiber core stripped of the outer coating to properly position the core with respect to the mating end of the terminal member. The through hole has a second portion rearwardly of the first portion which is sized sufficiently larger than the outer coating of the fiber optic cable to accommodate any eccentricity between the fiber core and the coating. The outer coating is fixedly secured within the second portion of the through hole by epoxy, or the like, to maintain the core properly positioned or centered with respect to the forward mating end of the terminal member. The boss portion is removed after the epoxy hardens, leaving the fiber core properly positioned or centered in the terminal member.

22 Claims, 8 Drawing Figures

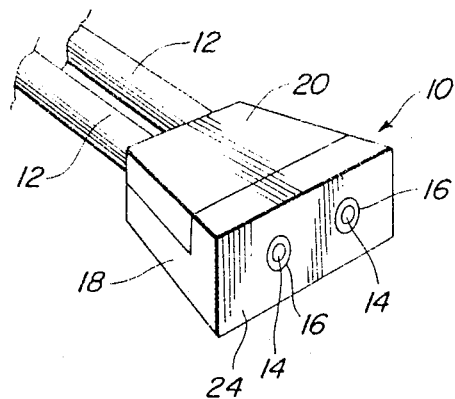
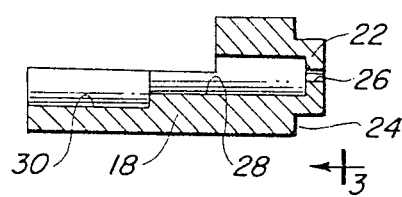 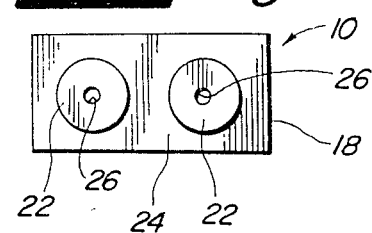
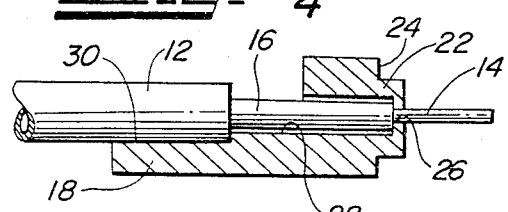
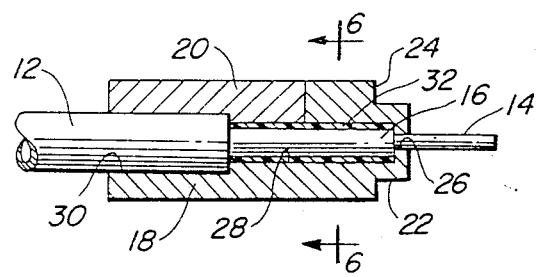 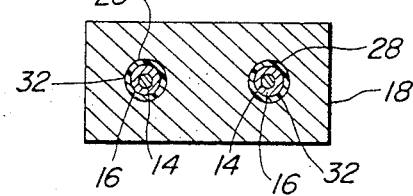
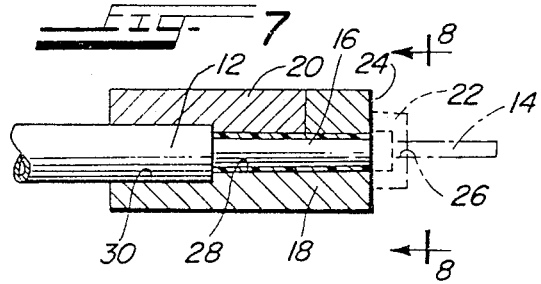 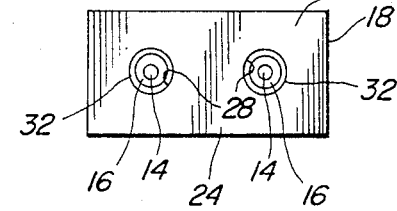

OPTICAL FIBER CONNECTOR AND MEANS AND METHOD FOR CENTERING OPTICAL FIBERS

This is a continuation of application Ser. No. 37,260, filed May 9,1979, now abandoned.

BACKGROUND OF THE INVENTION

This invention relates generally to fiber optic connectors and, more specifically, to a separable in-line fiber optic connector for coupling a pair of fiber optic cables or a single fiber optic cable and a light source or detector. The terminal end surface of an inner fiber core for use in lightwave transmission must be flat and highly polished to minimize insertion losses. The inner fiber core typically must also be axially, laterally, and angularly aligned within certain parameters to establish an excellent optical coupling between two fiber optic cables. The success achieved in the development and production of fiber optic cables has therefore focused strongly upon low loss connectors and couplers for such cables including in-line connectors. The ability to design, manufacture, deploy and service a data transmission line, for instance, requires suitable connectors in order to assure the continued progress of the fiber optics field. Accordingly, connectors for this and other applications must be developed which can be used without any significant increase in insertion losses.

Many fiber optic connectors presently available are precision, expensive instruments providing very low insertion losses but they are designed for certain applications such as long distance applications in telephonic systems and in other applications requiring extremely low insertion losses where expensive low loss connectors may be employed. It has been found, however, that expensive low loss connectors are not always well suited for applications requiring a large number of connectors where very expensive connectors are not economically feasible. For instance, in such applications as computers and other data transmission applications, a large number of fiber optic cables are employed and there is a need for low cost, low loss fiber optic connectors which minimize insertion losses due to off-centering of the fiber core relative to the connector or terminal member. It is well known in such applications to use low cost fiber optic cables in which the inner fiber core is often not concentric with the outer coating or cladding. Of course, this non-concentricity has a tendency to lead to excessive insertion losses when a connector that utilizes the outer coating or cladding as a jigging surface is put into a data transmission line.

As stated above, alignment of the fiber core is important to minimize insertion losses, but most connectors which are effective to properly position or center the core with respect to the mating terminal end of the connector or terminal member are very expensive instruments. This invention is directed to solving these problems by providing a new and improved fiber optic connector and means and method of centering or properly positioning optical fibers or inner fiber cores of fiber optic cables with respect to the mating terminal end of the connector.

SUMMARY OF THE INVENTION

Accordingly, a principal object of the present invention is to provide a new and improved low cost, low loss, separable in-line fiber optic connector adapted for coupling a pair of fiber optic cables or a single fiber optic cable and a light source or detector.

Another object of the invention is to provide a fiber optic connector which includes new and improved, simple and inexpensive means associated with the connector for properly positioning or centering an optical fiber or fiber core of a fiber optic cable with respect to the mating end of the connector.

A further object of the invention is to provide a means or method of centering an optical fiber or fiber core of a fiber optic cable in a fiber optic connector.

In using optical fibers, such as a plastic clad silica fiber, the inner fiber core or optical fiber often is not concentric with the outer diameter of the plastic cladding or outer coating. This non-concentricity leads to excessive insertion losses when a connector is put into a line that utilizes the outer diameter of the cladding or coating as a jigging means or surface. The present invention provides a fiber optic connector for optical coupling of a pair of fiber optic cables or a single fiber optic cable and a light source or detector, wherein the cable includes an outer coating and an inner fiber core which may or may not be concentric with the outer coating. The connector of the present invention mitigates against insertion losses by assuring that the fiber core is aligned with respect to the mating end of the connector, independently of the non-concentricity between the core and the outer diameter of the coating or cladding.

More particularly, the fiber optic connector of the present invention includes a terminal member having a through hole extending axially therethrough. The through hole has a first portion extending through a forward mating end of the terminal member. The first portion of the through hole is sized to snugly receive a length of the fiber core stripped of the outer coating to properly position the core with respect to the forward mating end of the terminal member. The through hole includes a second portion rearwardly of the first portion for receiving the outer coating. The second portion is sized sufficiently larger than the outer coating of the fiber optic cable to accommodate any eccentricity between the fiber core and the outer coating. Means are provided for fixedly securing the outer coating of the fiber optic cable within the second portion of the through hole to maintain the core properly positioned with respect to the forward mating end of the terminal member.

In the exemplary embodiment disclosed herein, the first portion of the through hole is formed in a reduced boss portion of the terminal member which protrudes outwardly from a body portion of the terminal member. The means for fixedly securing the outer coating of the fiber optic cable within the second portion of the through hole comprises an epoxy material. After the epoxy hardens, the boss portion is removed from the body portion of the terminal member, leaving the core properly positioned or centered in the terminal member, particularly with respect to the mating end of the terminal member. Of course, more than one through hole may be provided in a single terminal member body portion to accommodate a plurality of fiber optic cables.

DESCRIPTION OF THE DRAWINGS

The features of the present invention which are believed to be novel are set forth with particularlity in the appended claims. The invention, together with the further objects and advantages thereof, may best be understood by reference to the following description taken in conjunction with the accompanying drawings. In the drawings, like reference numerals identify like elements in the several figures, in which:

FIG. 1 shows a front perspective view of the fiber optic connector of the present invention having a pair of fiber optic cables terminated therein with the centering or positioning boss removed;

FIG. 2 is a vertical sectional view through the fiber optic connector and one of the through holes thereof, with the top portion of the connector removed;

FIG. 3. is an end elevational view looking in the direction of arrows 3—3 of FIG. 2;

FIG. 4 is a vertical sectional view similar to that of FIG. 2, with an inner fiber core of a fiber optic cable properly positioned so that a stripped portion of the core extends through the centering boss;

FIG. 5 is a vertical sectional view similar to that of FIG. 4, with epoxy material surrounding an outer coating of the fiber optic cable within the connector, with the top portion of the connector in proper position;

FIG. 6 is a vertical sectional view taken generally along the line 6—6 of FIG. 5;

FIG. 7 is a vertical sectional view similar to that of FIG. 5, with the centering boss and associated portions of the fiber optic cable removed, leaving the inner fiber core properly positioned in the terminal member; and FIG. 8 is an end elevational view looking generally in the direction of arrows 8—8 in FIG. 7.

DETAILED DESCRIPTION OF THE INVENTION

Referring to the drawings in greater detail, a separable in-line fiber optic connector is shown generally designated 10 in FIG. 1 which is designed to receive and terminate a pair of fiber optic cables 12. However, the connector may be designed to receive and terminate a single fiber optic cable or a plurality thereof more than the two cables shown. The fiber optic cable 12 is stripped so that a length of its inner fiber core 14 and a length of the cladding or outer coating 16 about the core 14 are exposed, as shown, in order to be properly received within the connector as described in greater detail hereinafter. The connector 10 includes a terminal member or body portion which includes a lower "half" 18 and an upper "half" 20. A similar type of split connector is shown in copending U.S. patent application Ser. No. 933,927, filed Aug. 15, 1978 and assigned to the Assignee of the present invention.

Referring to FIGS. 2 through 7, the body portion of the terminal member 10 initially is provided with a centering boss 22 molded integrally with the forward or mating end 24 which is defined by the forward end of the lower half 18 of the body portion of the terminal member. The centering boss 22 is reduced in size and protrudes outwardly or forwardly of the terminal mating end 24. In the examplary embodiment of the invention, a centering boss 22 is provided for each fiber optic cable as best shown in the end elevational view of FIG. 3, but it is contemplated that a single boss may be provided for multiple fibers.

The terminal member 10 includes a through hole extending axially therethrough. The through hole includes a first portion 26 (see particularly FIG. 2), a second portion 28, and a third portion 30. The first portion 26 of the through hole extends through the centering boss 22 and is sized to snugly receive the length of the fiber core 14 stripped of the outer coating 16 of the fiber optic cable 12 to properly position the core with respect to the forward mating end or face 24 of the terminal member 10. The second portion 28 of the through hole is disposed adjacent to or rearwardly of the first portion 26 for receiving the outer coated or cladded portion 16 of the fiber optic cable 12. The second portion 28 of the through hole is oversized or sized sufficiently larger than the outer coating 16 to accommodate any eccentricity between the fiber core 14 and the outer diameter of the coating 16. The third portion 30 of the through hole is provided to accommodate the remaining, rearwardly extending portion of the fiber optic cable 12. Of course, it is contemplated that a through hole which would include only the first and second portions 26 and 28, repectively, may be utilized for centering purposes.

The assembly of the fiber optic cable 12 within the respective portions 26, 28 and 30 of the through hole is best seen by first referring to FIG. 4. After this step of assembly, means are provided in the form of an epoxy material 32 for fixedly securing the outer coating 16 within the second portion 28 of the through hole. The top half 20 of the body portion of the terminal member 10 then is placed in position as shown in FIG. 5. Upon hardening of the epoxy material 32, the outer coating 16 will be fixedly secured in place within the connector to maintain the fiber core 14 properly positioned or centered with respect to the forward mating end or face 24 or the terminal member 10. The top half 20 of the terminal member also will be fixed in place about the coating 16 of cable 12.

The next step of the present invention is shown best in FIG. 7 and comprises the procedure of removing the centering boss 22 and associated fiber core or optical fiber and plastic cladding or outer coating 16 of the fiber optic cable 12 as shown by the phantom lines in FIG. 7. After the boss and cable portions are removed, as by shearing, the fiber optic cable 12 is properly positioned in the terminal member 10 with the core 14 properly centered with respect to the mating end or face 24, as shown in FIG. 6, not withstanding any eccentricity between the core 14 and the outer diameter of the outer coating 16. The end of the terminal member 10 then can be properly polished for in-line coupling of a pair of fiber optic cables or a single fiber optic cable and a light source or detector.

It is readily apparent from the above description of the present invention, including the overall fiber optic connector structure as well as the means and method of centering optical fibers, that the centering of the fiber core 14 with respect to the mating end of the terminal member 10 is not dependent upon the precise positioning of a jigging surface, such as the inner diameter of the through hole portion 28, as is prevalent in many fiber optic connectors presently available. In addition, other extraneous jigging means as is prevalent in many expensive optical fiber connectors or "instruments" is eliminated. Thus, with the present invention, it is contemplated to provide a fiber optic connector and centering means, wherein a terminal member simply includes first means for receiving the length of the fiber core 14 stripped of its outer coating 16 to properly position or center the core with respect to the mating end of the terminal member and second means for receiving the adjacent outer coated portion 16 of the fiber optic cable 12. Further, means for fixedly securing the outer coated portion 16 in the second means to maintain the fiber core 14 properly positioned with respect to the mating end of the terminal member 10 irrespective of any eccentricity between the fiber core 14 and the outer coated portion 16 are provided. Epoxy material 32 has been shown as one form of providing the securing means.

While in the foregoing specification a detailed description of the invention has been set forth for purposes of illustration, variation of the details herein given may be made by those skilled in the art without departing from the spirit and scope of this invention.

I claim:

1. A fiber optic connector for optically coupling a pair of fiber optic cables or a single fiber optic cable and a light source or detector, wherein said cable includes an outer coating and an inner fiber core which may or may not be concentric with said outer coating, comprising:

a terminal member having a through hole extending axially therethrough, said through hole having a first portion extending through a forward extension of said terminal member, said first portion being sized to snugly receive a length of said fiber core stripped of said outer coating to locate said core in a selected position in said terminal member, said through hole having a second portion rearwardly of said first portion for receiving said outer coating of said fiber optic cable, said second portion being sized sufficiently larger than said outer coating to accommodate any eccentricity between said fiber core and said outer coating; and means for fixedly securing said outer coating of said fiber optic cable within said second portion of said through hole to thereby maintain said fiber core in said selected position in said terminal member;

said forward extension being constructed so as to be readily removable from the remainder of said terminal member to form a forward mating end with said fiber core located in said selected position in said terminal member.

2. The connector of claim 1 wherein said first portion of said through hole is formed in a boss portion of said terminal member protruding outwardly from a body portion of said terminal member, said boss portion of said terminal member comprising said forward extension thereof, whereby said boss portion can readily be removed from said body portion leaving said fiber core located in said selected position in said terminal member.

3. The connector of claim 2 wherein said boss portion of said terminal member is formed integrally with said body portion.

4. The connector of claim 2 wherein at least a length of said second portion of said through hole is disposed within said boss portion.

5. The connector of claim 4 wherein said boss portion of said terminal member is formed integrally with said body portion.

6. The connector of claim 1 wherein said cable includes a plurality of outer coatings and inner fiber cores, said terminal member including a plurality of through holes, each of said through holes having a first and a second portion sized to receive respective ones of said fiber cores and said outer coatings, whereby each said fiber core is individually located in a selected position in said terminal member.

7. The connector of claim 6 wherein said first portions of said through holes are formed in a reduced boss portion of said terminal member protruding outwardly from a body portion of said terminal member, said reduced boss portion of said terminal member comprising said forward extension thereof, whereby said reduced boss portion can be readily removed from said body portion leaving said fiber cores located in said selected positions in said terminal member.

8. The connector of claim 7 wherein said reduced boss portion of said terminal member is formed integrally with said body portion.

9. The connector of claim 7 wherein at least a length of each of said second portions of said through holes is disposed within said reduced boss portion.

10. The connector of claim 9 wherein said reduced boss portion of said terminal member is formed integrally with said body portion.

11. The connector of claim 1 wherein said securing means comprises an epoxy material or the like for bonding said fiber cable to said terminal member while said fiber core is located in said selected position in said terminal member.

12. A fiber optic connector for optically coupling a pair of fiber optic cables or a single fiber optic cable and a light source or detector, wherein said cable includes an outer coating and an inner fiber core which may or may not be concentric with the outer coating, comprising:

a terminal member having first, forward means for receiving a length of said fiber core stripped of said outer coating and locating said core in a selected position in said terminal member, and having second means rearwardly of said first, forward means for receiving said outer coating of said fiber optic cable; and means for fixedly securing said outer coating of said fiber optic cable with respect to said second means to thereby maintain said fiber core in said selected position in said terminal member irrespective of any eccentricity between said fiber core and said outer coating;

said first means of said terminal member being readily removable from the remainder of said terminal member to form a forward mating end with said fiber core located in said selected position in said terminal member.

13. The connector of claim 12 wherein said first means of said terminal member for receiving said fiber core comprises a through hole extending through a forward extension of said terminal member.

14. The connector of claim 13 wherein said through hole is formed in a boss portion of said terminal member protruding outwardly from a body portion of said terminal member, said boss portion of said terminal member comprising said forward extension thereof, whereby said boss portion can readily be removed from said body portion leaving said fiber core located in said selected position in said terminal member.

15. The connector of claim 14 wherein said boss portion of said terminal member is formed integrally with said body portion.

16. The connector of claim 12 wherein said securing means comprises an epoxy material or the like for bonding said outer coating to said terminal member while said fiber core is located in said selected position in said terminal member.

17. The connector of claim 12 wherein said second means of said terminal member for receiving said outer coating comprises a through hole sufficiently oversized with respect to said coating to accommodate any said eccentricity between said fiber core and said coating.

18. The connector of claim 17 wherein said through hole is formed in a boss portion of said terminal member protruding outwardly from a body portion of said terminal member, whereby said boss portion can readily be removed from said body portion leaving said outer coating in said terminal member.

19. The connector of claim 17 wherein said securing means comprises an epoxy material or the like for bonding said outer coating to said terminal member while said fiber core is located in said selected position in said terminal member.

20. A method of locating an inner fiber core of a fiber optic cable in a selected position in a fiber optic connector, wherein said inner fiber core may or may not be concentric with an outer coating of said fiber optic cable, comprising the steps of:

providing said fiber optic connector with means for locating said inner fiber core in said selected position;

locating a length of said inner fiber core, stripped of said outer coating, in said selected position in said fiber optic connector utilizing said locating means;

securing a portion of said outer coating to said fiber optic connector while said inner fiber core is so located to thereby maintain said inner fiber core in said selected position in said fiber optic connector; and removing said locating means of said fiber optic connector after said outer coating portion is secured to said fiber optic connector.

21. The method of claim 20 including the step of stripping said outer coating from said length of said inner fiber core prior to said locating step.

22. The method of claim 20 wherein said securing step includes bonding said outer coating portion to said fiber optic connector by using an epoxy material or the like.

* * * * *